No. 749,700. PATENTED JAN. 12, 1904.
P. NAEF.
PROCESS OF LIXIVIATING ORES.
APPLICATION FILED MAY 24, 1902.
NO MODEL. 3 SHEETS—SHEET 1.
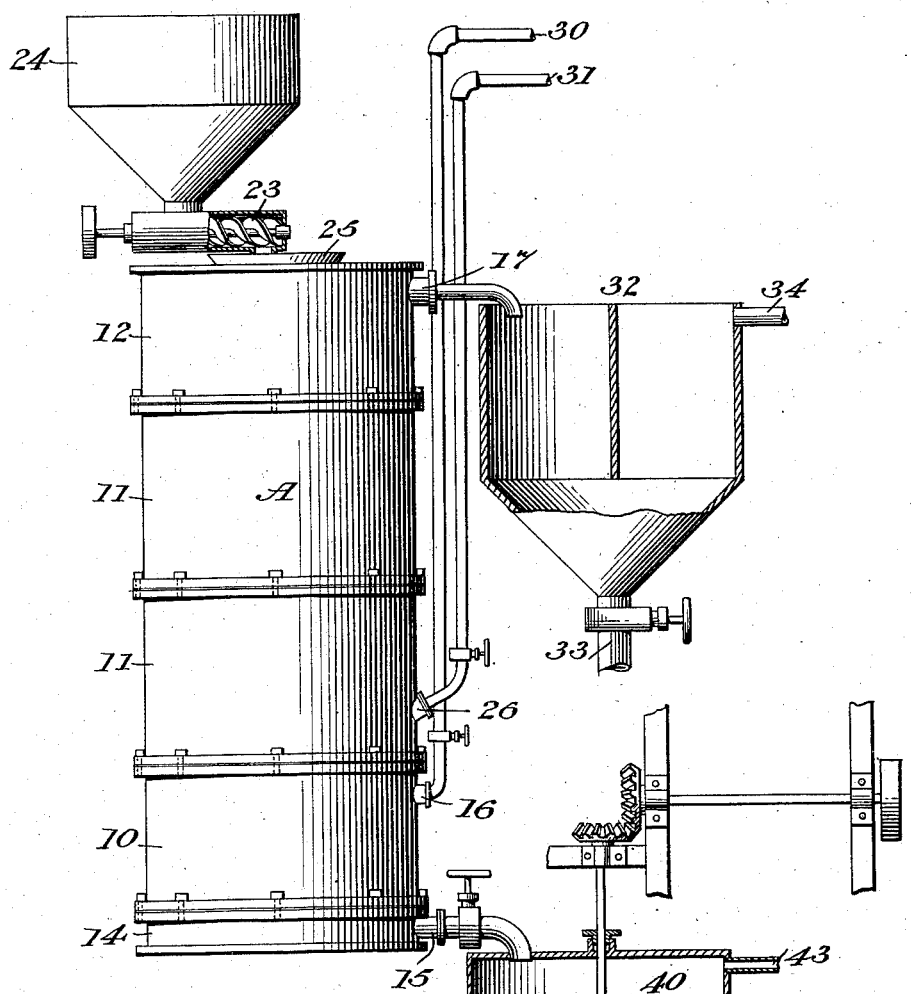

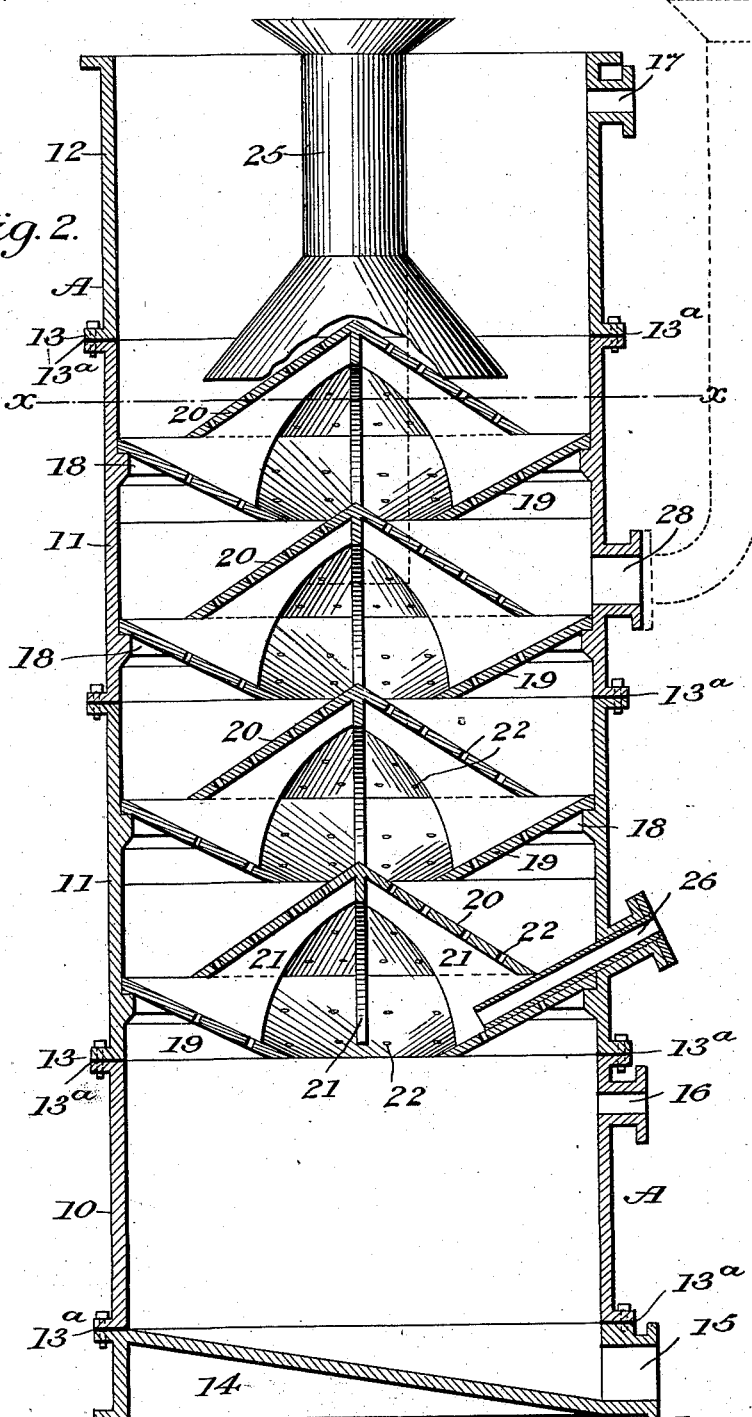

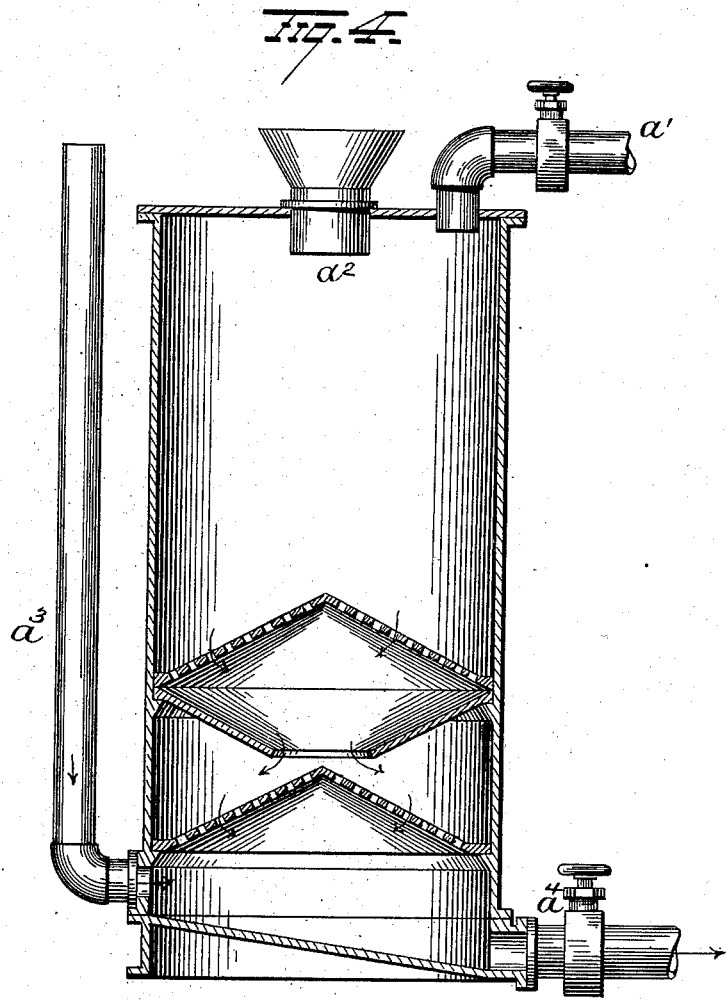

No. 749,700. Patented January 12, 1904.

UNITED STATES PATENT OFFICE.

PAUL NAEF, OF NEW YORK, N. Y.

PROCESS OF LIXIVIATING ORES.

SPECIFICATION forming part of Letters Patent No. 749,700, dated January 12, 1904.

Original application filed April 2, 1894, Serial No. 506,108. Divided and this application filed May 24, 1902. Serial No. 108,814.

(No specimens.)

*To all whom it may concern:*

Be it known that I, PAUL NAEF, Ph. D., a resident of New York, in the county of New York and State of New York, have invented certain new and useful Improvements in Processes of Lixiviating Ores; and I do hereby declare the following to be a full, clear, and exact description of the invention, such as will enable others skilled in the art to which it appertains to make and use the same.

My invention relates to an improved process for lixiviating ores, this case being a division of my application filed April 2, 1894, Serial No. 506,108.

Heretofore the lixiviation of ores and other pulverulent materials has usually been carried out in tanks fitted with mechanical agitators, the tanks being worked intermittingly. Much time is lost in charging and emptying the tanks, and when material is of high specific gravity—like, for instance, roasted copper ore is treated in such tanks—a large portion settles to the bottom, and the contact of the ore with the liquor is insufficient and the lixiviation imperfect. In lieu of mechanical stirrers agitation by means of a current of air has been proposed but seldom used, and leaching appliances of this latter character which have been heretofore proposed not only possess all the disadvantages enumerated above, but they also require large volumes of air and are specially unsuitable for the treatment of heavy material.

The objects of my invention are to make the lixiviation a continuous operation, thereby effecting a great saving in the time and labor required to produce a most intimate contact between the liquor and the material to be lixiviated, and thus to save time and obtain a complete lixiviation, and to economize the air or other gas employed by allowing it to act several times successively as an agitating medium while passing through the leaching solution. I attain these objects by means of a new method of procedure, whereby the comminuted material to be lixiviated is caused to travel downward by gravity through a leaching-tank, and the leaching solution is caused to move in the opposite direction, whereby the contact between the particles of ore or other material treated and the leaching solution is constantly changing and no stagnation or resting of either can take place. The leaching is further assisted by means of a current of gas or air flowing with the leaching solution and through and among the particles of the oppositely-traveling stream of ore, the air or gas current being repeatedly broken up and subdivided for the purpose of agitating the ore and assisting the process of lixiviation.

In the accompanying drawings, Figure 1 illustrates an apparatus to carry out my process. Fig. 2 is a vertical section of the lixiviating column or cylinder; and Fig. 3 is a transverse section of the same, taken on the line $x\ x$ of Fig. 2. Fig. 4 is a view of a modification.

The lixiviating-column A is composed of a series of superimposed cylinders 10, 11, and 12, having the flanges 13, and bolted together therethrough with gaskets $13^a$, of rubber or asbestos, in the usual way. The column thus formed rests on a base-piece 14, which is provided with a discharge-pipe 15 for the sludge, as hereinafter explained. The bottom and top cylinder-sections 10 and 12 are each provided with a pipe connection 16 and 17, respectively, the former for the inflow of the lixiviating solution and the latter for the outflow. The intermediate cylinder-sections 11 have shoulders or ledges 18. In the present case each cylinder is provided with two ledges, and supported on each ledge there is a funnel-shaped ring 19, having a central opening. Resting on each of these funnel-shaped rings there is a conical hood 20, supported in the present case by the downwardly-extending flanges 21, the bottoms of which have the angular shape of the funnel-rings 19 and stand thereon. Each hood has four of these supporting-flanges 21, which meet in an arch beneath the apex, and the diameter of the base of each hood is less than the diameter of the cylinders, so as to have an open channel therebetween. The special method of supporting the hoods is not an important feature. The rings 19 and hoods 20 have numerous perforations 22 for the upward passage of air or gas, as hereinbefore described, and in the case of the rings 19 the perforations are preferably confined to the portions of the rings that come beneath the hoods 20, so that all the air or gas forced into the column will meet both the hoods and rings in its ascension. The rings and hoods may with advantage be made of one casting. The sections of the cylinder are usually cast of hard lead, but may be of iron in cases where this metal is not attacked by the lixiviating solution. The ore or other material is fed into the column in a steady stream by means of a worm 23 or other automatic feed from a hopper 24, and it is delivered into the funnel-chute 25.

30 is a supply-pipe for the lixiviating solution coupled to the pipe-connection 16 of the cylinder 10, through which the liquor flows into the cylinder from the supply tank or pump, and 31 is an air or gas-supply pipe taking air from a compressor or gas and opening into the column at the level of the lowest of the perforated inclined surfaces. In Fig. 2 the air-pipe connection is shown at 26, the same extending in under the edge of the lower hood 20.

32 is a settling-tank which receives the overflow from the column through the pipe 17, and the mud carried over in suspension by the liquor here settles and is drawn off through the valve 33 for subsequent treatment, the liquor overflowing at 34.

A settling-tank 40 receives the lixiviating material drawn off at the bottom of the column through the valved discharge-pipe 15. This tank is made with a funnel-bottom having a valved outlet 41 and is provided with a slowly-revolving stirrer 42, which keeps the mud sufficiently agitated to prevent it from settling solid and packing in the conical bottom of the settling-tank. The motion of this stirrer is, however, so gentle as not to prevent the settling out of the lixiviating material from the small amount of liquor that may percolate or ooze out with the sludge through the outlet-pipe 15, and, further, the blades of the stirrer do not extend up into the upper portion of the settling-tank, but only operate in the material in the neighborhood of the mouth of the outlet-pipe 41. This is a feature of the invention conducive to the continuous and steady discharge of the pasty sludge from the settling-tank. After leaving the settling-tank the sludge is filtered in the usual way, and if the lixiviated material is heavy this settling-tank may be dispensed with and the sludge run direct to the filters. The liquor from the settling-tank 40 overflows at 43 and is pumped back into the apparatus along with the other liquor.

The ore or other material starting from the hopper 24 is fed in a steady stream into the top of the lixiviating-cylinder within the pipe 25 and gravitates down through the liquor onto the inclined surface of the upper hood 20, and thence glides down the successive inclined planes formed by the conical hoods and the funnel-rings to the bottom of the column. At the same time the lixiviating solution is forced or pumped into the bottom of the cylinder through the pipe 30 and inlet 16 in a steady stream and flowing upward overflows at 17 into the settling-tank 32, and the air or gas forced in through the pipe 31 and inlet 26 works its way upward through the perforations in the rings and hoods and the layers of ore moving downward thereon. The solid particles are thus kept in a state of suspension and are prevented from settling on the inclined surfaces and clogging the apparatus. It will be observed that the air or gas acts repeatedly as an agitating force on the layers of ore, that the entire current of air has to pass through the perforations of all the hoods, and the larger portion of it through the perforations of all the rings before it escapes through the funnel 25 at the top of the column, and that each time it also has to pass through a layer of the ore on the ring or hood. Hence a small volume of gas causes a very effective agitation of the pulverulent ore in the liquor. It will be further observed that as the material gets poorer in soluble matter it meets a stronger and less saturated solution, the condition most favorable for securing complete lixiviation.

The lower cylinder 10 is left without the perforated partitions or inclined surfaces to allow the material to settle and admit of being discharged as a thick sludge. It will be understood that the number of inclined surfaces used can be varied to suit the material treated.

The space within the column around the chute 25 and above the upper hood is free from the agitating influences of the air-currents, and most of the lighter particles held in suspension by the solution settle in this zone of quiet before the saturated liquor flows off at the top of the column. The liquor is afterward cleared by settling in large tanks or by filtration, and the small quantity of sediment obtained therefrom and what is not perfectly lixiviated is treated with fresh liquor in a separate tank or may be returned to the apparatus with the fresh ore.

If materials of low specific gravity are to be lixiviated, they are preferably introduced at a low point in the apparatus—as, for instance, through the opening 28—a feed-pipe for the pulverulent material being coupled thereto and indicated by dotted lines in Fig. 2. When this pipe is not to be used, it is closed or may be omitted in casting the cylinder-sections, or the funnel 25 may extend down into the column to the level of the pipe connection 28, as indicated by the dotted lines, Fig. 2, in which case the two upper perforated hoods have central holes for the passage of the pipe 25 therethrough. Some ores produce finely-divided residue when lixiviated, and if such material is charged directly into the top of the column the lighter particles would be carried off by the liquor without being lixiviated. By introducing such material at a lower level the perforated plates above the point of entrance effect a thorough mixing of such light matter as is carried upward by the liquor and secure a thorough lixiviation of the same.

In cases where the treatment requires such a length of time that continuous lixiviation is not practicable or where the residue settles bodily the apparatus herein described can be so arranged as to operate intermittingly without departing from the spirit of the invention in certain of its aspects. The column is then put together, with one or more of the cylinder-sections 11 fitted with the perforated inclined planes at the bottom and with several of the cylinder-sections 12 without the perforated partitions above. The apparatus is then charged with the liquor and ore and agitation is kept up by blowing in air or gas into the lowest cylinder until the lixiviation of the charge is completed. The charge is then run off into a settling-tank and the apparatus again charged. When thus used, the supply-pipe for the liquor may be at the top of the column.

The discontinuous operation is as follows: The apparatus, Fig. 4, is filled with liquor by means of pipe $a'$. The solid is charged through pipe $a^2$ in a suitable manner. Agitation is kept up by gaseous fluid blown in by pipe $a^3$ and acts several times as agitating medium in passing through the perforated plates. When lixiviation is complete, the product is run off by pipes and afterward the apparatus refilled. The same gaseous fluid may be taken from the top of the vessel and again introduced at the bottom to act as agitating medium. Some of the perforations in the cones shown in Fig. 4 may be bigger than others to facilitate emptying the tanks.

Having fully described my invention, what I claim as new, and desire to secure by Letters Patent, is—

1. The herein-described method of lixiviating ores and other pulverulent materials, which consists in passing the ore downward in thinly-divided layers in a zigzag course through an ascending stream of leaching solution, whereby the ore and the solution passing in a serpentine course in opposite directions produces a prolonged and intimate contact of the ore and solution.

2. The herein-described method of lixiviating ores or other pulverulent materials, which consists in passing the ore downward in thinly-divided layers through an ascending stream of leaching solution and at the same time passing a current of air or gas repeatedly through the ore layers in numerously-divided jets, whereby the ore particles are agitated in the solution, and the same volume of gas acts successively as an agitating medium.

3. The herein-described method of lixiviating ores or other pulverulent material, which consists in passing the ore downward in thinly-divided layers through a leaching solution and at the same time passing a current of air or gas repeatedly through the ore layers in numerous divided jets, whereby the ore particles are agitated in solution and the same volume of gas acts successively as an agitating medium.

4. The herein-described lixiviating method, which consists in agitating a solid and a liquid in such a manner, that gaseous fluid acts several times as agitating medium successively.

In testimony whereof I have signed this specification in the presence of two subscribing witnesses.

PAUL NAEF.

Witnesses:
 GRANT SQUIRES,
 C. L. CAROLIN.